US009142101B2

(12) United States Patent
Park et al.

(10) Patent No.: US 9,142,101 B2
(45) Date of Patent: Sep. 22, 2015

(54) AUTOMATED TELLER MACHINE WITH EPP GUARD CAVE

(71) Applicant: Nautilus Hyosung Inc., Seoul (KR)

(72) Inventors: Chan Won Park, Seoul (KR); Sung Kyu Kim, Gunpo-si (KR); Du Yong Moh, Hwaseong-si (KR); Dong Hee Leem, Seoul (KR); Jae Min Cha, Seongnam-si (KR)

(73) Assignee: NAUTILUS HYOSUNG INC., Seoul (KR)

( * ) Notice: Subject to any disclaimer, the term of this patent is extended or adjusted under 35 U.S.C. 154(b) by 0 days.

(21) Appl. No.: 14/135,151

(22) Filed: Dec. 19, 2013

(65) Prior Publication Data

US 2015/0013574 A1 Jan. 15, 2015

(30) Foreign Application Priority Data

Jul. 15, 2013 (KR) ........................ 10-2013-0082934

(51) Int. Cl.
*G06Q 40/00* (2012.01)
*G07F 19/00* (2006.01)

(52) U.S. Cl.
CPC ............ *G07F 19/205* (2013.01); *G07F 19/201* (2013.01)

(58) Field of Classification Search
CPC ............ G06Q 20/1085; G06Q 20/102; G06Q 20/105; G06Q 20/108; G06Q 20/20; G06Q 20/382; G06Q 20/40; G06Q 40/02; G07F 19/20; G07F 19/205; G07F 19/201; G07F 19/203; G06F 3/0488
USPC .................................................. 235/379, 382
See application file for complete search history.

(56) References Cited

U.S. PATENT DOCUMENTS

| | | | | | |
|---|---|---|---|---|---|
| 6,685,086 | B1 * | 2/2004 | Mackenzie et al. | ........... | 235/379 |
| 8,011,571 | B2 * | 9/2011 | Hurrell | ......................... | 235/379 |
| 8,061,590 | B2 * | 11/2011 | Day et al. | ....................... | 235/379 |
| 8,201,732 | B1 * | 6/2012 | Kropf et al. | ................... | 235/379 |
| 8,870,063 | B1 * | 10/2014 | Block et al. | ................... | 235/379 |
| 2002/0073032 | A1 * | 6/2002 | Holmes et al. | .................. | 705/43 |
| 2006/0112012 | A1 * | 5/2006 | Osborne | .......................... | 705/43 |
| 2009/0218203 | A1 * | 9/2009 | Taverner | ....................... | 200/304 |

* cited by examiner

*Primary Examiner* — Seung Lee
(74) *Attorney, Agent, or Firm* — Fenwick & West LLP

(57) ABSTRACT

The present invention relates to an automated teller machine having an EPP guard cave formed therein. More particularly, the present invention relates to an automated teller machine having an EPP guard cave formed therein, in which the EPP guard cave is recessively formed on the front surface of the automated teller machine toward the inside thereof and an encrypting pin pad (EPP) is installed inside the EPP guard cave formed as such, so that a user may conveniently use the automated teller machine without anxiety by effectively preventing the procedure of inputting personal information by the user from being exposed to surroundings or other people through a concaved structure without a separate structure such as an EPP guard plate since the user may put a hand into the EPP guard cave and input the personal information through the EPP when the user inputs the personal information through the EPP for a banking transaction.

8 Claims, 2 Drawing Sheets

AUTOMATED TELLER MACHINE WITH EPP GUARD CAVE

CROSS-REFERENCE TO RELATED APPLICATIONS

This application claims the benefit of Korean Patent Application No. 10-2013-0082934, filed on Jul. 15, 2013, which is incorporated by reference herein in its entirety.

BACKGROUND OF THE INVENTION

1. Field of Invention

The present invention relates to an automated teller machine having an EPP guard cave formed therein. More particularly, the present invention relates to an automated teller machine having an EPP guard cave formed therein, in which the EPP guard cave is recessively formed on the front surface of the automated teller machine toward the inside thereof and an encrypting pin pad (EPP) is installed inside the EPP guard cave formed as such, so that a user may conveniently use the automated teller machine without anxiety by effectively preventing the procedure of inputting personal information by the user from being exposed to surroundings or other people through a concaved structure without a separate structure such as an EPP guard plate since the user may put a hand into the EPP guard cave and input the personal information through the EPP when the user inputs the personal information through the EPP for a banking transaction. Furthermore, since a light emitting means configured be operable in a variety of modes is provided in the EPP guard cave formed in the automated teller machine, the user may easily recognize the EPP provided in the EPP guard cave, and, at the same time, an interior decoration effect may be improved since the light emitting means emits light of various colors according to mode selection of a manager of the automated teller machine.

2. Description of the Related Art

An automated teller machine (ATM) is an automated machine capable of supporting a basic banking service such as deposit or withdrawal without a teller regardless of time and space in relation to a banking service, and is configured to allow a user to perform a banking service such as deposit or withdrawal of cash or the like by himself or herself using a medium such as a card, a passbook. Owing to these advantages of the automated teller machine, the number of customers using the automated teller machine, the number of installed automated teller machines and the number of places where the automated teller machine is installed are increased abruptly, and the automated teller machines can be easily found at any place in these days.

In order to prevent other people from illegally accessing and using the automated teller machine, such an automated teller machine requests to first input a password before performing a banking process function and allows the banking process function to be performed only when the input password is matched to a previously registered password.

At this point, when a user inputs a password into the automated teller machine, the password of the user is protected by inputting the password using an encrypting pin pad (EPP) provided in a customer reception unit of the automated teller machine and encrypting the password. However, if the password input procedure is exposed by an illegally installed camera or other people in the surrounding area, an accident of leaking the password occurs.

Therefore, automated teller machines distributed recently are designed to be provided with an additional security structure such as an exposure protection cover for covering both sides and the like of an EPP in order to prevent a password from being exposed in the procedure of inputting the password through the EPP by the user.

However, the exposure protection cover provided in the EPP invites inconvenience of bumping a hand to the exposure protection cover when a user inputs a password, and since exposure of the movement of the hand of the user inputting the password is not perfectly protected, it is still worried that the password may be leaked by other people.

SUMMARY OF THE INVENTION

The present invention is conceived to solve the problems described above. An object of the present invention is to provide an automated teller machine having an EPP guard cave formed therein, in which the EPP guard cave is recessively formed on the front surface of the automated teller machine toward the inside thereof, and an encrypting pin pad (EPP) is installed inside the EPP guard cave formed as such, so that a user may conveniently use the automated teller machine without anxiety by effectively preventing the procedure of inputting personal information by the user from being exposed to surroundings or other people through a concaved structure without a separate structure such as an EPP guard plate since the user may put a hand into the EPP guard cave and input the personal information through the EPP when the user inputs the personal information through the EPP for a banking transaction. Furthermore, since a light emitting means configured be operable in a variety of modes is provided in the EPP guard cave formed in the automated teller machine, the user may easily recognize the EPP provided in the EPP guard cave, and, at the same time, an interior decoration effect may be improved since the light emitting means emits light of various colors according to mode selection of a manager of the automated teller machine.

The present invention for accomplishing the above object provides an automated teller machine having an encrypting pin pad (EPP), wherein an EPP guard cave is formed on a front surface of the automated teller machine in the shape of a cave recessed toward the inside thereof, and the EPP is installed inside the EPP guard cave, whereby through an EPP guard cave structure having the EPP installed inside the cave, a procedure of inputting personal information by a user using the EPP is prevented from being exposed to surrounding view angles.

DETAILED DESCRIPTION OF THE PREFERRED EMBODIMENT

Hereinafter, although an embodiment of the present invention will be described in detail, the present invention is not limited to the embodiment described below as far as it does not depart from the spirit of the present invention.

Figure 1:
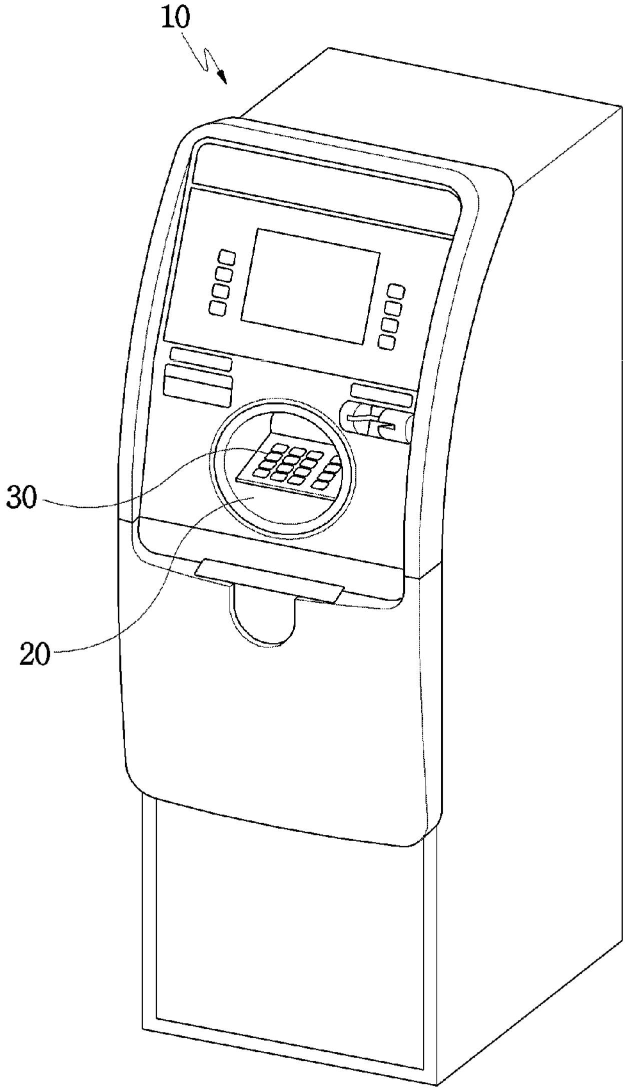
FIG. 1 is a view showing an automated teller machine having an EPP guard cave formed therein in accordance with one embodiment of the present invention.

FIG. 1 is a view showing an automated teller machine having an EPP guard cave formed therein in accordance with one embodiment of the present invention.

As shown in FIG. 1, in the automated teller machine having the EPP guard cave formed therein in accordance with one embodiment of the present invention, the EPP guard cave is recessively formed on the front surface of a main body 10 of the automated teller machine, and an encrypting pin pad (EPP) is installed inside the EPP guard cave.

That is, in the automated teller machine having the EPP guard cave formed therein as configured above, since the EPP for inputting personal information is placed inside the EPP guard cave which is recessively formed on the front surface of the automated teller machine, when a user inputs the personal information through the EPP for a banking transaction, the user puts a hand inside the EPP guard cave and inputs the personal information through the EPP, and thus, the user may conveniently use the automated teller machine without anxiety by effectively preventing the procedure of inputting the personal information by the user from being exposed to surroundings or other people.

Hereinafter, the configuration of the automated teller machine having the EPP guard cave formed therein in accordance with one embodiment of the present invention will be described. The EPP guard cave 20 is recessively formed on the front surface of the main body 10 of the automated teller machine provided with a customer reception unit for providing a banking transaction service to a user, and the EPP 30 is installed inside the EPP guard cave 20.

That is, the EPP 30 is a keypad for inputting personal information to be encrypted, such as a password, when a banking transaction is conducted, and since such an EPP 30 is installed inside the EPP guard cave 20 formed on the front surface of the main body 10 of the automated teller machine, a user puts a hand inside the EPP guard cave 20 and inputs the personal information through the EPP 30 provided inside the EPP guard cave 20 when the personal information is input for the banking transaction.

In the same manner, movement of the hand for inputting the personal information of the user is not exposed outside as the procedure in which the user inputs personal information such as a password through the EPP 30 is performed inside the EPP guard cave. Accordingly, since the personal information of the user is prevented from being exposed to an illegally installed camera or other people in the surrounding area, the user may input the personal information without anxiety.

In this embodiment, as shown in FIG. 1, a front opening of the EPP guard cave 20 is formed in the shape of a circle so as to effectively conceal the movement of the user's hand that handles the EPP 30.

Here, it is apparent that the front opening of the EPP guard cave 20 may be formed in an oval or polygonal shape according to an external appearance of the automated teller machine.

In addition, the front surface of the automated teller machine having the EPP guard cave 20 formed therein is formed to be inclined backward at a predetermined angle, which makes it possible for a user to easily recognize the EPP 30 placed inside the EPP guard cave 20.

That is, since the entrance of the EPP guard cave 20 is also formed to be inclined backward at a predetermined angle due to the inclination angle of the front surface of the automated teller machine of which the front upper portion is formed to be inclined backward, the EPP 30 placed inside the EPP guard cave 20 may be easily recognized from the position in which the user uses the automated teller machine.

Here, it is preferred that the front surface of the automated teller machine be formed to have the backward inclination angle of 3 to 10 degrees backward.

In addition, the top surface of the EPP 30 provided inside the EPP guard cave 20, on which a plurality of buttons is arranged, may be formed to be inclined forward at a predetermined angle so that a user may easily press the buttons.

That is, as the top surface of the EPP 30 having the plurality of buttons arranged thereon is formed to be inclined forward at 10 to 30 degrees with respect to the inner bottom surface of the cave, a user may easily recognize the button part formed on the top surface of the EPP 30 and conveniently handle the buttons.

Meanwhile, a light emitting means 40 is provided on the edge of the front opening of the EPP guard cave 20 and/or inside the EPP guard cave 20.

Figure 2:
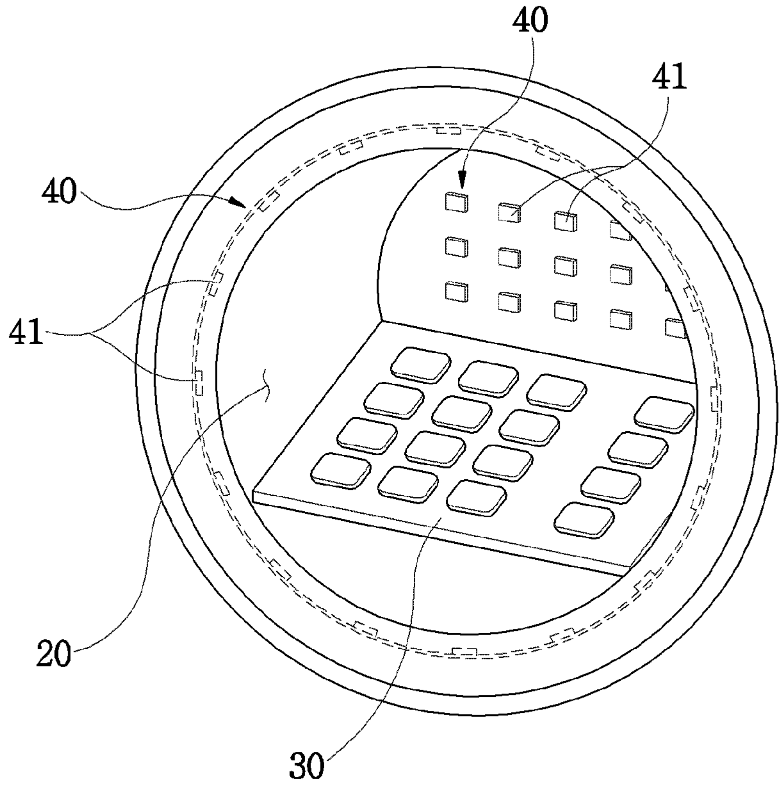
FIG. 2 is a view showing a structure in which an EPP and a light emitting means are provided in the EPP guard cave in one embodiment of the present invention.

FIG. 2 is a view showing a structure in which the EPP and the light emitting means are provided in the EPP guard cave in one embodiment of the present invention.

As shown in FIG. 2, the EPP, the top surface of which has a plurality of buttons arranged thereon and is formed to be inclined forward at a predetermined angle, is provided inside the cave, and the light emitting means 40 for emitting light of various colors is provided on the edge of the front opening of the EPP guard cave 20 and the inner wall surface of the EPP guard cave 20 of the main body 10 of the automated teller machine.

Here, the light emitting means 40 may be configured to have LED lamps, halogen lamps or any other lamps and preferably to have LED lamps having low power consumption and high efficiency.

Accordingly, in the present invention, a plurality of LED lamps 41 are installed along the edge of the front opening of the EPP guard cave 20, and a plurality of LED lamps 41 may be also installed on the rear wall of the inside of the EPP guard cave 20.

At this point, since the plurality of LED lamps 41 installed on the edge of the front opening of the EPP guard cave 20 and the inner wall surface of the EPP guard cave 20 are configured to emit light of various colors on the basis of a function of illuminating the inside of the EPP guard cave 20, a user may easily recognize and use the EPP provided inside the EPP guard cave, and, at the same time, the exterior design of the automated teller machine stands out.

In addition, the LED lamps 41 installed on the edge of the front opening and the inner wall surface of the EPP guard cave 20 as described above may operate in a variety of modes according to setting of a manager of the automated teller machine.

For example, in setting the operation mode of the LED lamps, four types of modes such as a power off mode, a color change mode, a designated color mode and a flickering mode are provided so that the manager of the automated teller machine may selectively set a mode.

That is, when the power off mode is set, the LED lamps 41 installed inside the EPP guard cave 20 maintain a turned off state, and when the color change mode is set, the color of light emitted from the LED lamps 41 installed inside the EPP guard cave 20 is sequentially changed.

For example, when the LED lamps 41 installed inside the EPP guard cave 20 operate in the color change mode, natural change of colors may be produced as the colors gradually change in order of reddish, greenish and bluish colors.

That is, when the LED lamps 41 are configured to emit light of six colors including cyan, blue, yellow green, white, green and pink, the colors sequentially and gradually change in order of red, yellow green, green, cyan, blue and pink and the change is repeated in this order. Accordingly, natural change of colors is produced, and thus user's recognizability may be increased while the exterior design of the automated teller machine stands out.

In addition, when the designated color mode is set, the LED lamps 41 installed inside the EPP guard cave 20 are lit in one color previously set by the manager of the automated teller machine.

In this case, the manager of the automated teller machine may set a color of the light emitted from the LED lamps 41 installed in the EPP guard cave 20 considering the surrounding environment of the place where the automated teller machine is installed, and accordingly, it is advantageous in that the automated teller machine can be harmonized with the surrounding environment and the interior decoration effect is enhanced.

That is, when the color of illumination around a place where the automated teller machine is installed is yellow, the color of light emitted from the LED lamps 41 may be adjusted to the surrounding environment by setting the color of light emitted from the LED lamps 41 installed inside the EPP guard cave 20 to a yellowish color.

In addition, when the flickering mode is set, the light emitted from the LED lamps 41 installed inside the EPP guard cave 20 repeats on and off and operates to continuously flicker, and thus it may draw attention of the user.

Here, such an operation mode of the LED lamps 41 may be set to a specific mode according to setting of the manager of the automated teller machine and, furthermore, may be set to operate while being changed to an appropriate mode according to an operation state of the automated teller machine.

For example, the LED lamps 41 may be set to operate in the power off mode, the designated color mode or the flickering mode when the automated teller machine is in a standby state, or in the color change mode or the designated color mode when a user uses the automated teller machine. In addition, the LED lamps are changed to the flickering mode when input of a password or the like through the EPP 30 is required, and thus use of the EPP 30 may be further efficiently guided.

Meanwhile, although it has been described in the above-described embodiment that the light emitting means 40 such as LED lamps is configured to be provided on the edge of the front opening of the EPP guard cave 200 and the inner surface of the EPP guard cave 20 of the main body 10 of the automated teller machine, it is apparent that the light emitting means 40 may be installed only at a part of the edge of the front opening of the EPP guard cave 20 or the inner surface of the EPP guard cave 20 according to the external structure of the automated teller machine.

As described above, in the automated teller machine having the EPP guard cave formed therein according to the present invention, since the EPP guard cave is recessively formed on the front surface of the main body toward the inside thereof, and the EPP is installed inside the EPP guard cave, a user may input the personal information through the EPP while putting his or her hand inside the EPP guard cave when the user inputs the personal information through the EPP for a banking transaction, and thus movement of the hand inputting the personal information is effectively concealed by the EPP guard cave. Therefore, leakage of the personal information, which may occur as the procedure of inputting the personal information by the user is exposed, may be fundamentally prevented, and thus the user may input the personal information without anxiety.

Furthermore, since there is provided a light emitting means for emitting light of various colors in the EPP guard cave provided in the automated teller machine and the light emitting means is configured to operate in a variety of modes such as a power off mode, a color change mode, a designated color mode and a flickering mode, a user may easily recognize and use the EPP installed inside the EPP guard cave, and the interior decoration effect may be enhanced.

The present invention is not limited to the above-described embodiments and the accompanying drawings since it should be understood by those skilled in the art that various replacements and modifications can be made thereto without departing from the technical spirit of the invention.

What is claimed is:

1. An automated teller machine comprising:

a body formed with a cave recessed from a front portion of the body toward a rear of the body;

an encryption pin pad (EPP) installed inside the cave of the body, to at least partially obstruct view to the EPP from a location outside the EPP responsive to a user's hand being inserted into the EPP to input information using the EPP;

a light emitting device provided around an edge of a front opening of the cave; and a screen provided on a part of the body outside the cave.

2. The automated teller machine according to claim 1, wherein the EPP is formed along a plane inclined relative to an inner bottom surface of the cave at a predetermined angle.

3. The automated teller machine according to claim 2, wherein the top surface of the EPP is inclined at 10 to 30 degrees with respect to the inner bottom surface of the cave.

4. The automated teller machine according to claim 1, wherein the cave is inclined backward by a predetermined degree.

5. The automated teller machine according to claim 1, wherein another light emitting device is provided inside the cave.

6. The automated teller machine according to claim 1, wherein the light emitting device comprises one or more light emitting diodes (LEDs).

7. The automated teller machine according to claim 6, wherein the automated teller machine is configured to control a light emitting mode of the light emitting device according to mode setting of a manager of the automated teller machine.

8. The automated teller machine according to claim 7, wherein the light emitting mode is any one of a power off mode, a color change mode for sequentially changing colors of emitted light, a designated color mode for fixing the color of emitted light as designated, and a flickering mode for flickering the emitted light.

* * * * *